United States Patent [19]
Kasselmann

[11] 3,800,666
[45] Apr. 2, 1974

[54] SOLENOID OPERATED SERVOMOTOR

[75] Inventor: John T. Kasselmann, Southfield, Mich.

[73] Assignee: The Bendix Corporation, South Bend, Ind.

[22] Filed: June 12, 1972

[21] Appl. No.: 261,873

[52] U.S. Cl. .................... 91/376, 91/369 A, 91/459
[51] Int. Cl. ...................... F15b 9/03, F15b 13/044
[58] Field of Search ................ 91/369 A, 376, 459; 60/54.5 P, 54.6 P

[56] References Cited
UNITED STATES PATENTS

| | | | |
|---|---|---|---|
| 1,611,961 | 12/1926 | Thompson | 91/459 X |
| 2,338,974 | 1/1944 | Schmidt | 60/54.6 P |
| 2,372,393 | 3/1945 | Ray | 91/459 X |
| 3,021,821 | 2/1962 | Prather | 60/54.6 P |
| 3,048,979 | 8/1962 | Grigsby et al. | 60/54.6 P |
| 3,173,338 | 3/1965 | Schultz | 91/369 A |
| 3,364,818 | 1/1968 | Hager et al. | 91/376 X |
| 3,441,111 | 4/1969 | Spalding | 91/459 X |

*Primary Examiner*—Irwin C. Cohen
*Attorney, Agent, or Firm*—Leo H. McCormick, Jr.; William N. Antonis

[57] ABSTRACT

A servomotor for pressurizing wheel brakes of a braking system in response to an electrical operational signal. The electrical operational signal is created by a series of resistors which proportionally regulate the transmission of operational current to a solenoid. The solenoid will correspondingly exert an operational force through a push rod on a valve to develop the pressurization which will bring a desired rate of deceleration braking to the wheel brakes.

1 Claim, 2 Drawing Figures

SOLENOID OPERATED SERVOMOTOR

BACKGROUND OF THE INVENTION

Most vehicles currently being produced have a power assist servomotor for operating the wheel brakes, the servomotor being controlled through the application of an input force from an operator. The operator applies this input force by pushing on a foot pedal and through a series of levers delivers the input force to the servomotor. However, in some vehicles, because of the lack of space for installation of a servomotor adjacent the foot pedal, the servomotor must be located in some other area of the vehicle. In this type of location several levers are necessary to operate the servomotor. Unfortunately, as the operational force is transmitted through these levers, lost motion occurs with a noticeable time lag from the input force supplied by the operator to the servomotor.

SUMMARY OF THE INVENTION

I have developed a servomotor which can be installed in a position remote from the operator compartment of a vehicle and operated through an electrical signal corresponding to a desired rate of braking deceleration. The servomotor has a solenoid operated control valve which receives an input force corresponding to the electrical operation signal. The control valve upon initially receiving the input force from the servomotor will terminate a vacuum suspended condition across a wall means in the servomotor and allow air under pressure to be communicated to one side of the wall means. With vacuum on one side and air under pressure on the other side, a pressure differential is created across the wall means. The pressure differential causes the wall means to move and exert a pressurizing force on an output member. The wall means will move until a reactionary force back from the output member is in balance with the input force. With the wall means in a stationary condition, a constant output force corresponding to the electrical signal will result.

It is therefore the object of this invention to provide a servomotor with an electrical operational control means responsive to an electrical signal representative of a desired rate of braking deceleration.

It is another object of this invention to provide a servomotor with a solenoid operated control valve for selectively allowing an operational pressure differential to develop across a force transmitting means.

It is still another object of this invention to provide a power braking system having a servomotor located in a position remote from the driving compartment with an operational switching means for creating an electrical operational signal corresponding to a desired rate of braking deceleration.

These and other objects will become apparent from reading the specification and viewing the drawings.

DETAILED DESCRIPTION OF THE PREFERRED EMBODIMENT

Figure 1:
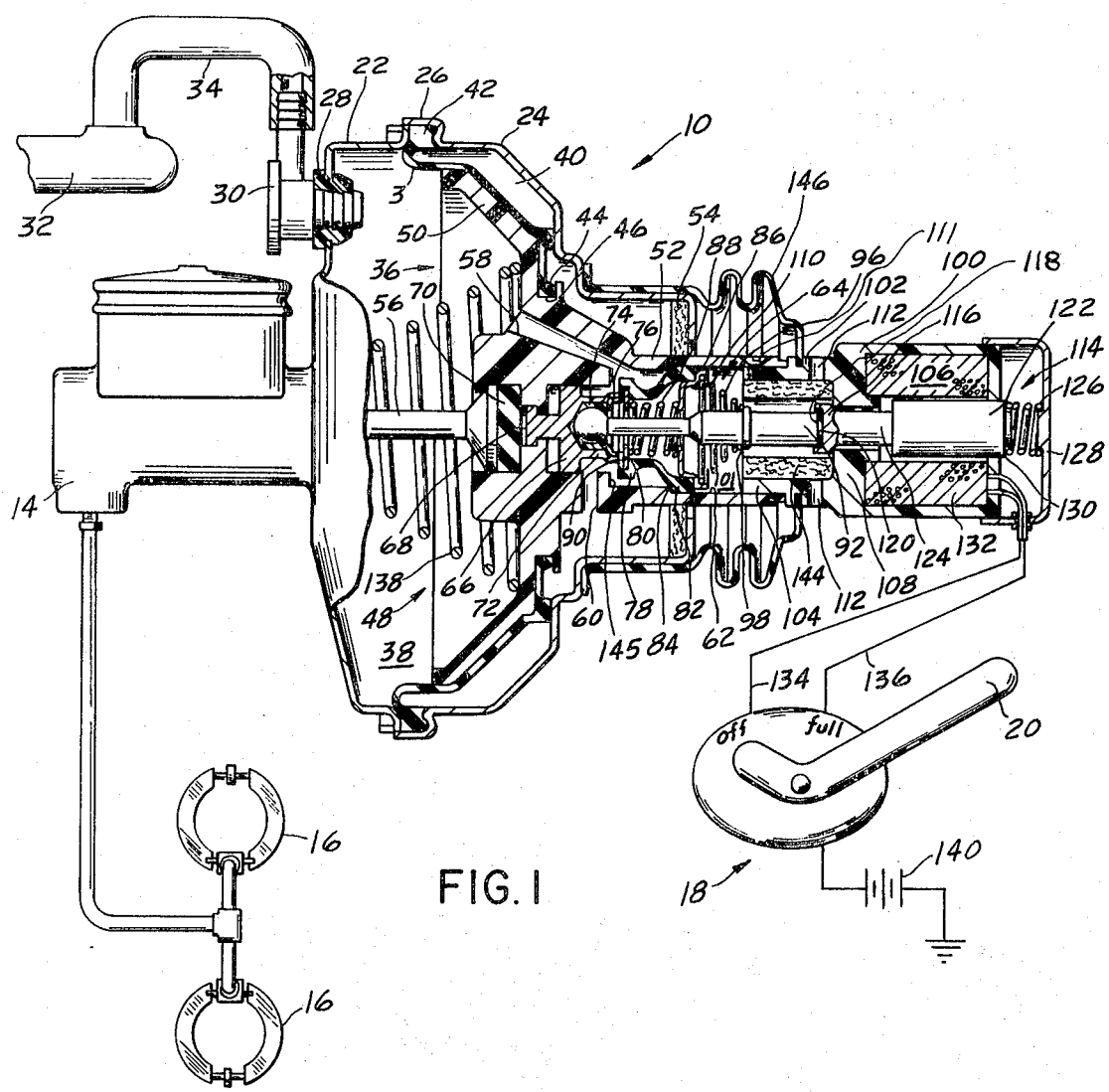
FIG. 1 is a schematic view of a power braking system with a sectional view of an electrically operated servomotor.

The power braking system 10 shown in FIG. 1 includes an electrically operated servomotor means 12 attached to a master cylinder 14. The master cylinder 14 has a power piston means (not shown) which is moved in response to the servomotor means 12 for supplying the individual wheel brakes 16 with pressurized fluid corresponding to a desired rate of braking deceleration. The servomotor means 12 is adaptable to be mounted in a location remote from the operator's compartment of the vehicle. The servomotor means 12 will be operated through a switching means 18 hand controlled by lever 20, or equally well through a master cylinder pressure actuator (not shown) acting on the switching means. The lever 20 can be adjusted through a variable range of energizable positions 19 from off to match the particular rate of braking deceleration suited for each desired stop.

The servomotor means 12 consists of a housing formed of a front shell 22 joined to a rear shell 24 through a twist lock arrangement 26 to create a sealed cavity. The front shell 22 has an opening 28 into which a check valve 30, similar to that disclosed in U. S. Pat. No. 3,626,978, is inserted. The check valve 30 in turn is connected to a source of vacuum, typically that produced at the intake manifold 32 through a conduit 34. The sealed cavity is divided by a wall means 36 into a front chamber 38 and a rear chamber 40. The wall means 36 includes a diaphragm 39 whose outer periphery 42 is held between the front shell 22 and the rear shell 24 through the twist lock connection 26 and whose inner periphery 44 snaps into a groove 46 on hub means 48.

The hub means 48 has an annular plate 50 which supports the diaphragm 39 and a tubular projection 52 located in the rear chamber 40. The tubular projection 52 rearwardly extends through the rear sheel 24 and is retained by seal 54 in an axially aligned position with an output rod 56 going to the master cylinder 14. The hub means 48 has a first passage 58 connecting the front chamber 38 to a central bore 62 in the tubular projection 52. A second passage 60 connects the central bore 62 with the rear chamber 40. Control valve means 64 located in the central bore 62 is adapted to selectively allow vacuum communication from the front chamber 38 through the first passage 58 past the central bore 62, out the second passage 60 into the rear chamber 40 to vacuum suspend the wall means 36.

The control valve means 64 has a stepped piston 66 similar to that disclosed in U. S. Application 150,326 and incorporated herein by reference, with a face 68 adjacent a reaction disc 70 and an axial bore 72 for receiving an elastomeric bearing 74 as disclosed in U. S. Application 128,754. A rearwardly facing annular atmospheric valve seat 76 surrounds the bore 72 for sealing with a flexible annular rubber poppet member 78. One end 90 of the poppet member 78 surrounds a disc 80 while the other end 82 has an enlarged periphery which is held against a shoulder 84 by an annular retainer 86 with an inwardly projecting lip 110. A first resilient means 88 is located between the lip 110 and the disc 80 for urging end 90 of the poppet member 78 toward the atmospheric valve seat 76.

The control valve means 64 is operated by a push rod 92 which has a spherical head 94 held in the stepped piston 66 by the elastomeric bearing 74. A second resilient means 96 is located between the annular retainer 86 and a shoulder 98 on the push rod 92. The second resilient means 96 will urge the rearwardly facing annular seat 76 toward end 90 to aid in assuring that a positive atmosphere seal will be created upon engagement of the seat 76 with end 90.

A connector 100 having a tubular projection 102 has a stepped portion 104 concentric to tubular projection 52 separated from a motor chamber 106 by a bearing wall 108. The stepped portion 104 is secured to the tubular projection 52 through a series of retainers 111, see FIG. 2. The tubular projection 102 has a series of openings 112 which connect the atmospheric chamber 101 of the central bore 62 to the atmosphere.

A plunger means 114 has a head 116 which surrounds the end 118 of the push rod 92. A pad of elastomeric material 120 is located between the end 118 of the push rod and the head 116 to attenuate the transmission of noise between the two. The plunger means 114 has a cylindrical body 122 connected to the head 116 by a stem 124. The stem 124 is retained in the bearing wall 108 in an axially aligned position with respect to the output means 56. A third resilient means 126 is located between the housing 128 and the end 130 of the cylindrical body 122. The third resilient means 126 will dampen the reaction forces transmitted through the disc 70 to the piston 66.

A coil 132 located in the motor chamber 106 surrounds the cylindrical body 122. The coil 132 is longer than the cylindrical body 122. The coil 132 is connected to the switching means 18 through leads 134 and 136.

MODE OF OPERATION OF THE PREFERRED EMBODIMENT

With the lever 20 of the switching means 18 in the off position as shown in FIG. 1 and vacuum produced at manifold 32 communicated through conduit 34 to the front chamber 38, vacuum from the front chamber 38 is communicated through the first passage 58 into the central bore 62 out the second passage 60 to evacuate the rear chamber 40 of air and vacuum suspend the wall means 36. With the wall means 36 suspended in vacuum, spring 138 through the support plate 50 holds the diaphragm 38 against the rear shell 24.

When the operator desires to apply the wheel brakes 16 and bring the vehicle to a stop, lever 20 is moved from the off position. Electrical energy from battery source 140 is converted through a series of resistors, such as a rheostat, into an electrical signal represntative of a desired rate of braking deceleration.

This electrical signal is relayed through leads 134 and 136 to energize coil 132 of the solenoid means 142. The coil 132, upon being energized, will act on the plunger means 114 and overcome the second resilient means 96 to begin to center the cylindrical body 122 of the plunger means 114 within the coil through a produced magnetic field. During initial movement of the plunger means 114, the push rod 92 will correspondingly move piston 66 allowing the first resilient means 88 to seat end 90 on lip 145 of the hub means 48. With lip 145 on seat 90, communication of vacuum through the first passage 58 is terminated. Further movement of the cylindrical portion 122 to the centering position of the coil 132 will move the annular seat 76 away from the end 90 to open a path through the central bore 62 through the second passage 60 to the rear chamber 40. With this path opened, air at atmospheric pressure will enter the central bore 62 by passing through openings 112 and filter 144. The air at atmospheric pressure will flow through the second passage 60 into the rear chamber 40 and create a pressure differential across the wall means 36. This pressure differential will cause the wall means 36 to exert an operational force through the hub means 48 on the output means 56. The air at atmospheric pressure will continue to enter into the rear chamber until the reaction disc 70 exerts a rearward force on the face 68 of the piston means to move the annular seat 76 against the end 90 of the poppet. The third resilient means 126 will dampen the rearward force from the disc on the piston 66 to provide a smoothing effect on the produced operational force. As the wall means 48 moves the tubular projection 52 will slide in bearing 54 and correspondingly carry the solenoid 142 along. Boot 146 secured to the tubular projection 102 adjacent the openings 112 and the rear shell 24 will protect the bearing surface from contaminants which may score tubular projection 52.

For a larger or more rapid braking applicaton the lever 20 is appropriately moved toward the full position where more energizing current can be supplied to the coils 132.

Figure 2:
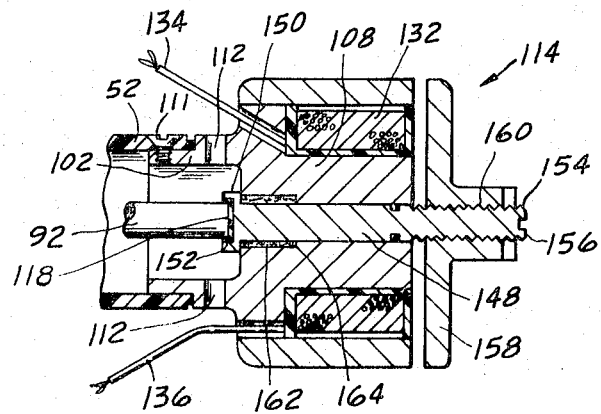
FIG. 2 is a sectional view of a secondary embodiment of an electrically energizable powering unit for the servomotor of FIG. 1.

In the embodiment shown in FIG. 2, parts corresponding to FIG. 1 are similarly marked; the plunger means 114 consists of a shaft 148 retained in a bearing wall 108. The shaft has a head 150 on one end which surrounds the end 118 of the push rod 92. A disc of elastomeric material 152 is inserted between the head 150 and the end 118 of the push rod 92. The shaft 148 has a threaded section 154 on the other end 156 to which a plate 158 is attached by matching threads 160. A spring 162 surrounds the shaft 148 and is held between a shoulder 164 in the bearing wall and the head 150 to dampen the reactionary force from the disc 70. Now when coil 132 is energized, the magnetic attraction will act on plate 158, whose periphery extends past the flow path of the created magnetic flux, drawing the plate against the bottom 133 of the coil 132. The coil 132 of the embodiment in FIG. 2 through the combined attraction of the plate 158 and the centering effect of the magnetic field on the shaft 148 can have a smaller number of turns and still have the same intensity of input to the push rod 56.

Thus, through my invention the servomotor 12 is operated through an electrical signal which is controlled by the operator. The operator through the rheostatic type switch means 18 can readily adjust the porting of the air under pressure to provide a uniform rate of deceleration for pressurizing the fluid to the wheel brakes 16.

I claim:
1. A servomotor for providing an output force to pressurize fluid for operating the wheel brakes of a vehicle in a power brake system in response to an electrical signal, said servomotor comprising:
a housing having an internal cavity therein;
wall means for dividing said cavity into a front chamber and a rear chamber, said front chamber being connected to a source of vacuum;
hub means secured to said wall means having a rearward projection extending through said rear chamber for slidable retention by said housing, said rearward projection having a central bore, said central bore being connected to the front chamber by a first passage and the rear chamber by a second passage, sad central bore being connected to a source of air under pressure;

valve means located in said central bore;

push rod means connected to said valve means for selectively moving said valve means from a first position where vacuum is communicated from the front chamber through the first passage into the central bore out the second passage into the rear chamber to vacuum suspend said wall means to a second position where said air under pressure is communicated through the central bore out the second passage into the rear chamber for creating a pressure differential across said wall means in response to an operational input force, said pressure differential causing said wall means to move and develop said output force;

first resilient means which surrounds said push rod means for urging said valve means toward said front chamber;

retainer means located in said central bore for holding said first reilient means and said valve means in a fixed relationship with said first and second passages;

second resilient means located between and secured to said retainer means and push rod means for urging said push rods means away from said front chamber into said first position;

a tubular member surrounding said push rod means and secured to said rearward projection of said hub means having a stepped axial bore therein;

plunger means located in said stepped axial bore and retained in axial alignment with said push rod means by a bearing surface;

said plunger means having a head member connected to said push rod means;

elastomeric means located between said head and said push rod means for absorbing any noise transmitted through said push rod means being moved from the first position to the second position;

switching means actuated by an operator for establishing a variable electrical signal corresponding to a desired rate of braking deceleration;

a solenoid located in said stepped bore of the tubular member to surround said plunger means, said solenoid responding to said electrical signal to develop a magnetic attraction on said plunger means, said magnetic attraction being directly proportional to said desired rate of braking deceleration, said plunger means being moved through said magnetic attraction to impart said operational force on said push rod means to move said valve means from said first position to said second position; and third resilient means connected to said plunger means for attenuating a reaction force transmitted through the push rod means in opposition to the development of the output force upon movement of the wall means to assure a substantial uniform actuation of the wheel brakes of the vehicle.

* * * * *